United States Patent

Espindola et al.

[11] Patent Number: 6,141,470
[45] Date of Patent: Oct. 31, 2000

[54] MAGNETICALLY RECONFIGURABLE OPTICAL GRATING DEVICES AND COMMUNICATION SYSTEMS

[75] Inventors: Rolando Patricio Espindola, West Orange; Sungho Jin, Millington; Hareesh Mavoori, Berkeley Heights; Thomas Henry Tiefel, deceased, late of North Plainfield, all of N.J., by Linda J. Tiefel, administratrix

[73] Assignee: Lucent Technologies, Inc., Murray Hill, N.J.

[21] Appl. No.: 09/020,206

[22] Filed: Feb. 6, 1998

[51] Int. Cl.[7] .................................................. G02B 6/34
[52] U.S. Cl. ................................. 385/37; 385/24
[58] Field of Search .................. 385/57, 37, 13, 385/24

[56] References Cited

U.S. PATENT DOCUMENTS

| | | | |
|---|---|---|---|
| 5,007,705 | 4/1991 | Morey et al. | 350/96.29 |
| 5,781,677 | 7/1998 | Jin et al. | 385/37 |
| 5,812,711 | 9/1998 | Glass et al. | 385/37 |

*Primary Examiner*—Hung N. Ngo

[57] ABSTRACT

The invention is a reconfigurable optical grating device using force from programmable magnets to alter the mechanical strain, preferably a tensile strain, on the gratings so as to induce a latchable change in grating periodicity using a pulse or short-duration current. It includes apparatus for limiting the maximum strain applied to the grating so that the fiber does not fracture, and it provides strain without rotation or twisting of the fiber grating. In preferred embodiment it provides control of magnetic force so as to accurately obtain a predetermined amount of strain and hence wavelength shift in the grating with a minimal amount of electrical power. The inventive structure is useful, e.g. for wavelength division multiplexed optical communication system comprising wavelength channel add/drop devices and/or dynamically gain-equalized amplifiers.

20 Claims, 9 Drawing Sheets

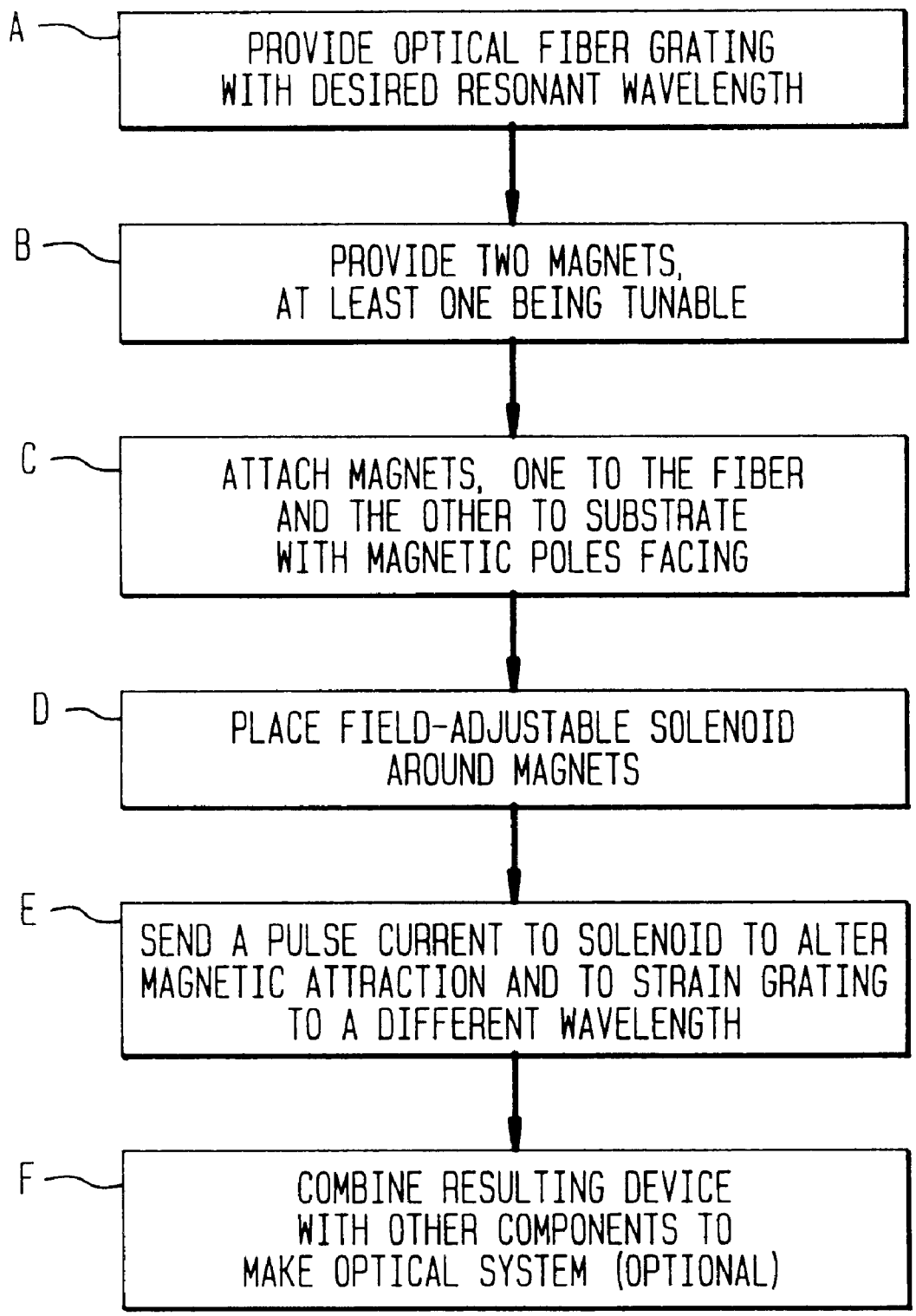

MAGNETICALLY RECONFIGURABLE OPTICAL GRATING DEVICES AND COMMUNICATION SYSTEMS

FIELD OF THE INVENTION

The present invention relates to magnetically reconfigurable optical grating devices and to communication systems using them. In particular, it concerns devices and systems including programmable gratings reconfigurable by temporary magnetic force.

BACKGROUND OF THE INVENTION

Optical fibers are key components in modern telecommunication systems. Basically, optical fibers are thin strands of glass capable of transmitting an optical signal containing a large amount of information over long distances with very low loss. In essence, an optical fiber is a small diameter waveguide comprising a core having a first index of refraction surrounded by a cladding having a second (lower) index of refraction. Typical optical fibers are made of high purity silica with minor concentrations of dopants to control the index of refraction.

Optical gratings are important elements for selectively controlling specific wavelengths of light within optical systems such as optical communication systems. Such gratings include Bragg gratings, long period gratings and diffraction gratings. Such gratings typically comprise a body of material and a plurality of substantially equally spaced optical grating elements such as index perturbations, slits or grooves. Reconfigurabilty would be highly useful in all types of gratings.

A typical Bragg grating comprises a length of optical waveguide, such as optical fiber, including a plurality of perturbations in the index of refraction substantially equally spaced along the waveguide length. These perturbations selectively reflect light of wavelength $\lambda$ equal to twice the spacing $\Lambda$ between successive perturbations times the effective refractive index, i.e. $\lambda=2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, adding and dropping signal channels, stabilization of semiconductor lasers, reflection of fiber amplifier pump energy, and compensation for waveguide dispersion.

Waveguide Bragg gratings are conveniently fabricated by doping a waveguide core with one or more dopants sensitive to ultraviolet light, e.g., germanium or phosphorous, and exposing the waveguide at spatially periodic intervals to a high intensity ultraviolet light source, e.g., an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

A difficulty with conventional Bragg gratings is that they filter only a fixed wavelength. Each grating selectively reflects only light in a narrow bandwidth centered around $\lambda=2n_{eff}\Lambda$. However in many applications, such as wavelength division multiplexing (WDM), it is desirable to have a reconfigurable grating whose wavelength response can be controllably altered.

One attempt to make a tunable waveguide grating uses a piezoelectric element to strain the grating. See Quetel et al., 1996 Technical Digest Series, Conf. on Optical Fiber Communication, San Jose, Calif., Feb. 25–Mar. 1, 1996, Vol. 2, p. 120, paper No. WF6. The difficulty with this approach is that the strain produced by piezoelectric actuation is relatively small, limiting the tuning range of the device. Moreover, it requires a continuous application of electrical power with relatively high voltage, e.g., approximately 100 volts.

U.S. patent application Ser. No. 08/791,081 filed by Jin et al. on Jan. 29, 1997, describes magnetically tunable optical fiber gratings including devices that are tunable and latchable between two wavelengths by temporary magnetic force. Such devices are useful, but a device reconfigurable among more than two wavelengths would be even more useful.

Long-period fiber grating devices provide wavelength dependent loss and may be used for spectral shaping. A long-period grating couples optical power between two copropagating modes with very low back reflections. A long-period grating typically comprises a length of optical waveguide wherein a plurality of refractive index perturbations are spaced along the waveguide by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10 \lambda$. Typically $\Lambda'$ is in the range 15–1500 micrometers, and the width of a perturbation is in the range $\frac{1}{5} \Lambda'$ to $\frac{4}{5}\Lambda'$. In some applications, such as chirped gratings, the spacing $\Lambda'$ can vary along the length of the grating.

Long-period fiber grating devices selectively remove light at specific wavelengths by mode conversion. In contrast with conventional Bragg gratings in which light is reflected and stays in the waveguide core, long-period gratings remove light without reflection, as by converting it from a guided mode to a non-guided mode. A non-guided mode is a mode which is not confined to the core, but rather, is defined by the entire waveguide structure. Often, it is a cladding mode. The spacing $\Lambda'$ of the perturbations is chosen to shift transmitted light in the region of a selected peak wavelength $\lambda_p$ from a guided mode into a nonguided mode, thereby reducing in intensity a band of light centered about the peak wavelength $\lambda_p$. Alternatively, the spacing $\Lambda'$ can be chosen to shift light from one guided mode to a second guided mode (typically a higher order mode), which is substantially stripped off the fiber to provide a wavelength dependent loss. Such devices are particularly useful for equalizing amplifier gain at different wavelengths of an optical communications system.

A difficulty with conventional long-period gratings, however, is that their ability to dynamically equalize amplifier gain is limited, because they filter only a fixed wavelength acting as wavelength-dependent loss elements. Each long-period grating with a given periodicity ($\Lambda'$) selectively filters light in a narrow bandwidth centered around the peak wavelength of coupling, $\lambda_p$. This wavelength is determined by $\lambda_p=(n_g-n_{ng})\cdot\Lambda'$, where $n_g$ and $n_{ng}$ are the effective indices of the core and the cladding modes, respectively. The value of $n_g$ is dependent on the core and cladding refractive index while $n_{ng}$ is dependent on core, cladding and air indices.

In the future, multi-wavelength communication systems will require reconfiguration and reallocation of wavelengths among the various nodes of a network depending on user requirements, e.g., with programmable add/drop elements. This reconfiguration will impact upon the gain of the optical amplifier. As the number of channels passing through the amplifier changes, the amplifier will start showing deleterious peaks in its gain spectrum, requiring modification of the long-period grating used to flatten the amplifier. Modifying the long-period grating implies altering either the center wavelength of the transmission spectrum or the depth of the coupling.

Thus, there is a need for reconfigurable long-period gratings whose transmission spectra can be controlled as a function of the number of channels and power levels transmitted through an amplifier. It is desirable to have reconfigurable long-period gratings which, upon activation, can be made to dynamically filter other wavelengths (i.e., besides $\lambda_p$). It is also desirable to be able to selectively filter a broad range of wavelengths. Further, reconfigurable long period gratings can be useful for suppressing amplifier spontaneous emission (ASE), and can also be used as tunable loss element for filtering out undesirable remnant signals from communication channel Add/Drop operations.

Diffraction gratings typically comprise reflective surfaces containing a large number of parallel etched lines of substantially equal spacing. Light reflected from the grating at a given angle has different spectral content dependent on the spacing. The spacing in conventional diffraction gratings, and hence the spectral content, is generally fixed.

In view of the foregoing, it can be seen that there is a need for programmable optical gratings including Bragg gratings, long-period gratings and diffraction gratings whose spacing can be latchably reconfigured.

SUMMARY OF THE INVENTION

The invention is an optical grating device using force from programmable magnets to reconfigure the mechanical strain, preferably a tensile strain, on the gratings so a pulse or a short-duration current can induce a latchable change in grating periodicity. Preferred embodiments include waveguide gratings with magnet gaps dimensioned for limiting the maximum strain applied to the grating and guides for providing strain without rotation or twisting. The magnets provide force so as to accurately obtain a predetermined amount of strain and hence a latchable wavelength shift in the grating with a minimal amount of electrical power. A preferred device includes a temperature sensor and feedback arrangement for automatic temperature compensation. The device is especially useful in WDM communication systems, particularly for adding or dropping channels and for dynamically gain-equalized amplifiers.

BRIEF DESCRIPTION OF THE DRAWINGS

The advantages, nature and additional features of the invention will appear more fully upon consideration of the illustrative embodiments described in the accompanying drawings. In the drawings:

FIG. 4 is a flow diagram illustrating the exemplary steps for making the inventive tunable and latchable grating assembly;

It is to be understood that these drawings are for purposes of illustrating the concepts of the invention and are not to scale. The same reference numerals are used to designate similar elements throughout the drawings.

DETAILED DESCRIPTION

Figure 1:
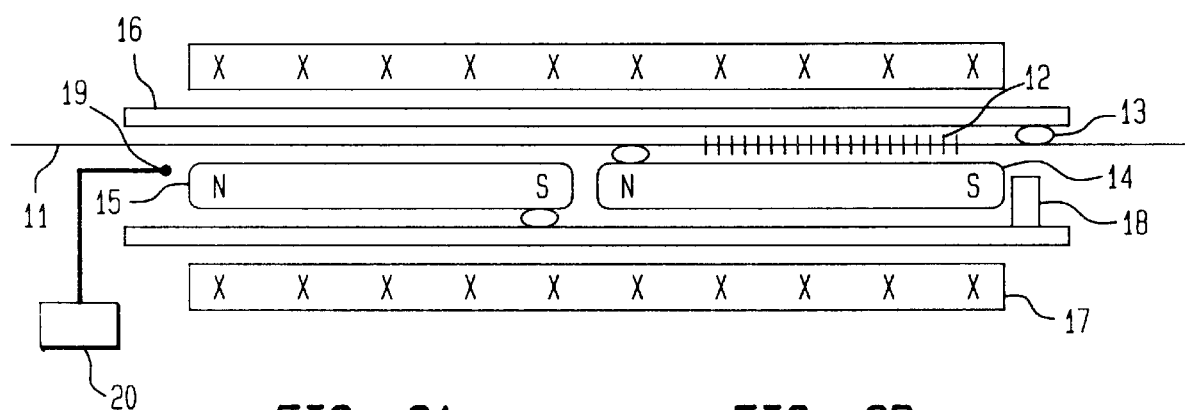
FIG. 1 schematically illustrates an exemplary magnetically tunable fiber grating device according to the invention.
Figure 2A:
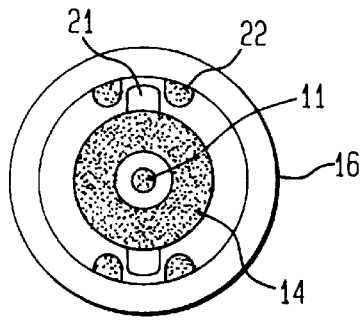
FIGS. 2(a)–(e) schematically illustrates exemplary cross-sectional shapes of the programmable magnets and the guiding rail structure in the tunable grating assembly according to the invention.
Figure 2B:
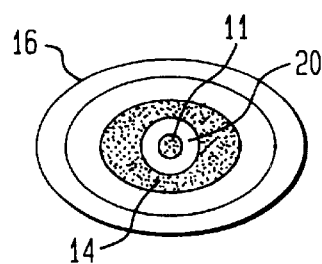
Figure 2C:
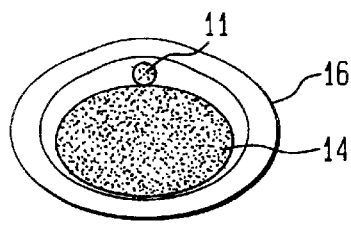
Figure 2D:
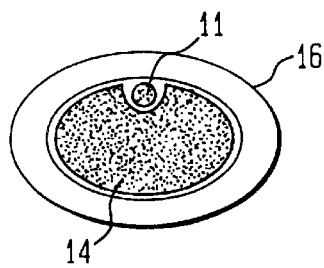
Figure 2E:
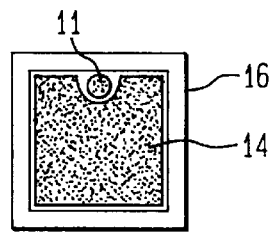

Referring to the drawings, FIG. 1 schematically illustrates an exemplary reconfigurable fiber grating device 10 comprising a length of optical fiber 11 including a grating 12 of index perturbations. The fiber in the region of the grating is secured, as by bonds 13 or mechanical attachment, between a programmable magnet 14 and the guiding container 16 for transmitting magnetic force from the magnet 14 to the grating 12. A second magnet 15, bonded to container 16, is provided for applying force to magnet 14. The magnets can have guided cylindrical shape, but non-round cross-sectional shapes are preferred in order to minimize fiber twisting during handling or service. One or more electromagnets (solenoids) 17 are disposed adjacent the magnets for providing a controllable magnetic field between them. The guiding container 16 is preferably a tube but can also have other configurations, e.g., it can comprise a two-part assembly with u-shaped bottom and top pieces.

The guiding container 16 is typically a tube made of glass, quartz, metal or plastic. The fiber grating is attached to magnet 14 and the guiding container 16 either by mechanical clamping or by bonds, as with epoxy or solder. In the use of solder, the fiber surface is desirably coated with a metal layer to improve solder bond strength. Here the adhesive is shown as bond 13. An optical temperature sensor 19 and feedback system 20 are shown connected to electromagnet 17 in order to compensate the effects of temperature change.

As illustrated in FIG. 1, magnets 14, 15 are aligned with a small air gap between them. They are preferably oriented so that opposite poles are adjacent (S adjacent N, and the field from electromagnet 17 will produce a tensile strain on the grating. The magnet 14 that is not bonded onto the guiding container 16 is advantageously constrained, as by a stop 18. In order to eliminate the thermal expansion related change of magnet length (magnet 15) and resulting change of the gap between the magnets, and hence change of the magnetic force and fiber strain, the magnet-container bonding location is chosen to be as close to the air gap as possible, with the bond-to-gap distance being less than 5%, preferably less than 2% of the magnet length.

In operation, the force transmitted from the magnets 14, 15, and 17 to the grating produces a strain which changes the wavelength response of the grating. The force between two attracting magnets is approximately proportional to the square of the magnetic induction (M) multiplied by the cross-sectional area (A) of the magnets at the gap (F $M^2 \cdot A$). Thus stronger magnets (higher M) or larger magnets (larger A) give stronger force. However, strong magnets with high coercivity are difficult to program or tune. When the fiber grating is stretched or compressed, e.g., 1% in length ($\epsilon = \Delta l/l = 0.01$), the grating periodicity $\Lambda$ will also change. However, the resonating Bragg reflection wavelength $\lambda$ will not change by exactly 1%, since the interatomic distance in the glass is also affected by the elastic strain and as a result the refractive index n is altered. This strain effect on the refractive index can be represented by a photoelastic constant $P_\epsilon$ which is typically about 0.22 for the $SiO_2$ fiber. The wavelength change induced by the magnetically applied strain $\epsilon$ ($\epsilon = \Delta l/l$) is thus expressed as $\Delta\lambda/\lambda = (\Delta l/l)(1-P_\epsilon) = \epsilon(1-P_\epsilon)$. The strain $\epsilon$ is determined by the applied stress ($\sigma$) and the elastic modulus (E), $\epsilon = \sigma/E$, and the stress on the fiber is the force (F) divided by the cross-sectional area ($\pi r^2$) where r is the radius of the fiber grating. Rearranging these equations, $\Delta\lambda/\lambda = (F/\pi r^2)(1/E)(1-P_\epsilon)$. For example, for $\lambda = 1550$ nn, F=1200 gm gives a shift in wavelength $\Delta\lambda = 16.01$ nm or about 1% change. For a wavelengthdivision-multiplex channel spacing of 0.8 nm, this induced $\Delta\lambda$ is sufficient to alter the filtered wavelength over a 20 channel span.

Since optical fiber tends to break at a tensile strain of less than about 6%, and since such a failure would be disastrous, it is highly desirable to have a tunable grating design that automatically provides an upper limit in total tensile strain. The assembly configuration of FIG. 1 offers such an advantage because the pre-set gap between the two magnets serves as the upper limit. When the fiber is stretched by magnetic force and the magnets eventually touch each other, the tensile elongation of the fiber can not proceed. The desired length of the gap between the two magnets in FIG. 1 (the upper limit in fiber elongation) is typically less than 4% of the fiber length being stretched (e.g., for 2" long fiber containing the grating, the gap is set below ~80 mil), and preferably less than 2% of the length of the grating-containing fiber. The latter value is equivalent to about one-third of the fiber breaking strain.

It is also important to make sure that the fiber grating is not subjected to a torsional deformation, as torsion reduces the fiber breaking strength for a given tensile strain and may distort optical signals. To eliminate or reduce torsional deformation, guiding mechanisms are provided for the magnets, either by adding guide rails in the case of circular cross-sectioned container or by using a non-circular container. Examples of non-circular containers are illustrated in FIGS. 2(*a*)–(*e*). The fiber can be located either outside the magnets or within a hole in magnets.

Figure 3A:
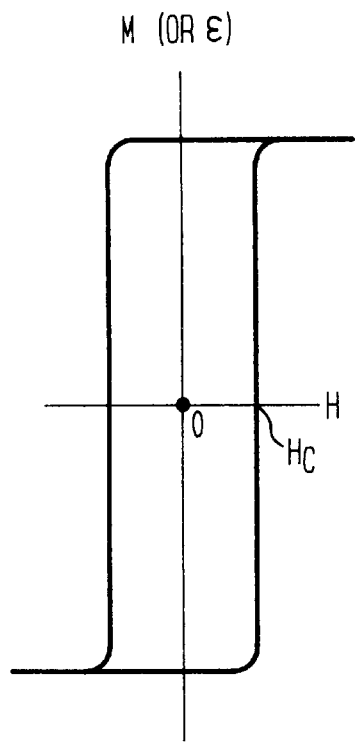
FIGS. 3(a)–(c) represents a schematic graphical illustration describing the benefit of optimally demagnetized configuration for the programmable magnet.
Figure 3B:
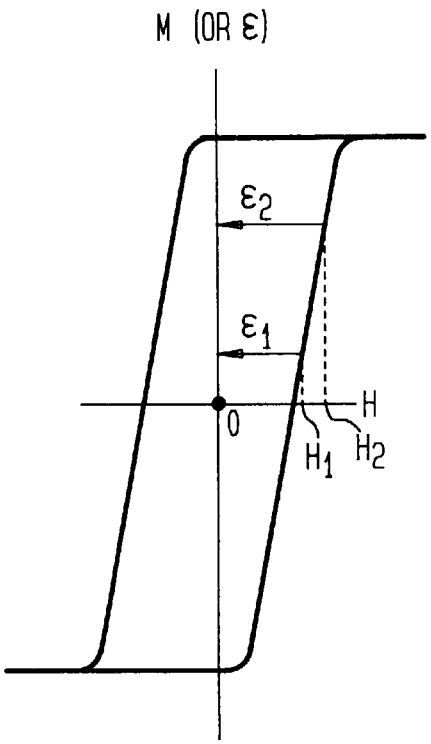
Figure 3C:
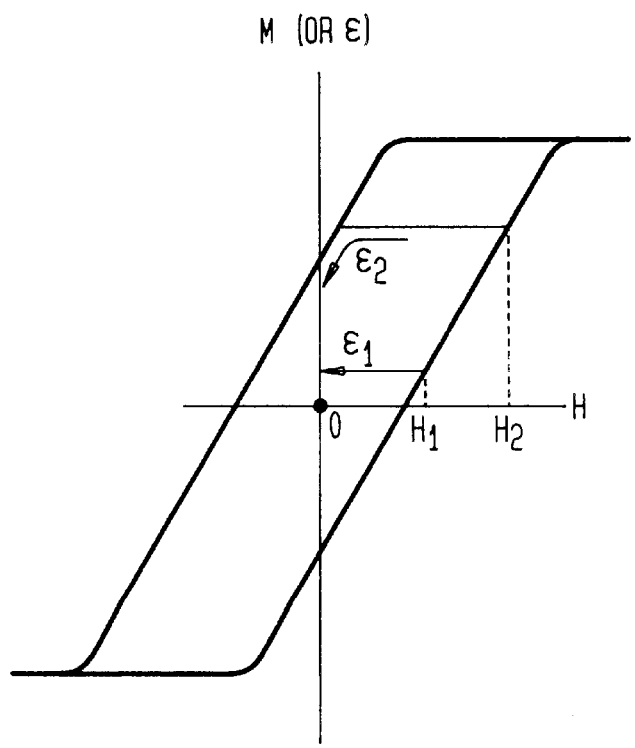

FIGS. 3*a*, 3*b*, and 3*c* illustrate M v H hysteresis loops for three different types of magnets pertinent to the invention. An important advantage of the reconfigurable grating device is that continuous power is not required to maintain the induced change in grating periodicity and hence the induced wavelength shift. This is possible because of the latchability of magnetic force in the square loop magnets 14,15. The device can be bistably tuned between two wavelengths. A magnetic material with strong anisotropy and an axis of magnetization aligned parallel to the optical fiber axis has a square hysteresis loop as shown in FIG. 3*a*. See Jin et al., IEEE Trans. Magn., MAG-23, No. 5, p. 3187 (1987), which is incorporated herein by reference. The use of deformation aged Fe—Cr—Co alloys is preferred for magnets exhibiting such a loop shape.

With magnets exhibiting a square hysteresis loop, one can make bistable strain devices that switch between two wavelengths: e.g. a zero strain Bragg reflection wavelength $\lambda_o$ and a saturation-strained reflection wavelength $\lambda_1$. $\lambda_o$ is achieved by applying an AC demagnetizing field. $\lambda_1$ is achieved by a DC pulse current sufficient to saturate the magnets. The advantage of the bi-stable device is reduced sensitivity to the applied current or to stray magnetic field.

For a continuous tuning of wavelength, the square loop characteristic of fiber strain vs applied magnetic field is not always desirable as the steep side of the curve in FIG. 3(*a*) can pose a control problem when a certain intermediate strain is aimed at, e.g., for tuning over a many-channel span. For ease of controlling the strain in the fiber grating, the M-H and $\epsilon$-H loop can be skewed as in FIG. 3(*b*). This is achieved by increasing the self-demagnetizing field of the magnets e.g., by either increasing effective diameter of the magnet or reducing the length and thus decreasing the magnet length-to-diameter aspect ratio. The optimal skewing of the loop is as illustrated in FIG. 3(*b*), i.e., the remanent magnetization or the remanent fiber strain when the applied field is removed is still essentially the same as the saturation value (at least 90%) and the onset field of rapid decrease of M or $\epsilon$ when the field is reversed is near zero field and preferably in the range of ±30% of the coercive force, even more preferably in the range of ±10% of the coercive force ($H_c$). An excessive skewing of the M-H or $\epsilon$-H loop as shown in FIG. 3(*c*) is not desirable as this causes a deterioration of the latchability of strain induced in the grating. Such a deterioration in latchable strain is indicated by arrows in FIG. 3(*c*).

An example of intentional loop skewing is as follows. For an Fe-28% Cr-7%Co alloy, deformation-aged to yield a square M-H loop with $H_c$ of 70 Oe, a dimension of 0.180" diameter and 4" length introduces a skewing of the M-H loop by ~60 Oe, producing a M-H loop similar to FIG. 3(*b*).

FIG. 4 is an exemplary flow diagram illustrating the steps in the preferred process for making the tunable optical fiber grating of FIG. 1. The first step shown in block A is to provide an optical fiber grating, e.g., Bragg grating having a desired Bragg reflection wavelength for dropping or adding a wavelength component, or a long period grating with a periodicity for desired peak wavelength of coupling. For example, for a median light beam wavelength of 1550 nm, the Bragg grating periodicity $\Lambda$ in a $SiO_2$ based fiber (with a refractive index n~1.45) is 500 nm. The length of each optical fiber grating to be incorporated into the grating assembly is typically in the range of 5 mm to 200 mm and preferably in the range of 10–100 mm. For the short fiber grating, the region of the regular fiber outside the grating can be used for attachment to either the magnetic components or the guiding container (or a substrate).

The next step shown as block B is to provide magnetic components and a guiding container to be attached to the fiber grating. At least two magnetic components, each either a single piece or an aggregate, are needed. They are oriented with their magnetic poles preferably parallel to the axis of the fiber grating. In the inventive tunable grating, at least a portion of each magnetic component should be semi-hard or permanent with a remanent magnetization. Yet its strength in at least one magnet should be programmable, erasable and reprogrammable by altering the applied magnetic field. When the two magnets have the opposite magnetic poles facing each other, e.g., the north against the south pole, they attract each other. The fiber grating attached to one of the magnet and the guiding container is under tensile stress, with the tensile elastic strain $\epsilon$ proportionally increasing as the stress $\sigma$ is increased ($\epsilon=\sigma/E$ where the elastic modulus $E=1.5\times10^6$ psi for silica glass).

The third step (block C of FIG. 4) is to align and attach the grating to one of the magnets and the guiding container. The magnets can desirably have one of the various exemplary configurations shown in FIG. 2. To assure a strong bonding and minimize strain relaxation at the bond interface, the use of mechanically strong, non-thermoplastic adhesive or a solder with a relatively high melting point, high mechanical strength and high creep resistance is desired. The fiber surface to be attached is desirably coated with a metallization layer to improve the solder bond strength.

For maximizing the magnetic force for a given volume of the magnet, the air gap between the facing poles should be very small. The magnetic force decreases as the gap is increased. The desired gap is less than about 80 mil, and preferably less than 20 mil and even more preferably less than 10 mil. It is preferable to set the gap so that the maximum tensile strain in the fiber grating is kept to about ~2% or less so that the risk of fiber breaking is minimized.

The preferred magnet materials are those whose magnetic properties are modifiable by a pulse magnetic field. Some examples of suitable magnets are Fe—Cr—Co, Fe—Al—Ni—Co (Alnico), Cu—Ni—Fe (Cunife), Co—Fe—V (Vicalloy), specially-processed, low-coercivity ($H_c$) rare earth cobalt (Sm—Co) or Nd—Fe—B magnets, and Ba-ferrite or Sr-ferrite magnets. The desired range of the coercivity for the programmable magnet is typically below 500 Oe and preferably below 100 Oe for the ease of programming by re-magnetization using solenoid pulse field. The coercivity is typically above 10 Oe and preferably above 30 Oe for maintaining the stability of the remanent magnetization and also for stability against demagnetization due to stray magnetic fields. For satisfactory latchability of fiber strain when the field is removed, the programmable magnet should have a square magnetization hysteresis loop with the squareness ratio (remanent magnetization/ saturation magnetization) of at least 0.85, preferably at least 0.90, even more preferably at least 0.95. Mechanically ductile and easily formable or machineable magnet alloys such as Fe—Cr—Co, Cu—Ni—Fe, Co—Fe—V are particularly desirable for shaping into desired rod-like geometry shown in FIG. 2. Stable permanent magnets with high coercive forces (e.g., $H_c>1000$ Oe), such as Sm—Co or Nd—Fe—B are less desirable (unless modified to exhibit lower coercive forces) because of the difficulty in reprogramming the remanent magnetization using desirably low magnetic field. These stable magnets, however, can be used for supplying a basis (or bias) field, in combination with programmable magnets.

The next steps in FIG. 4 (Steps D and E) are to add at least one solenoid winding around the magnetic components and to apply a programmed pulse or a short-duration field to adjust or remove the remanent magnetization in the magnets. This adjustment alters the force and the strain on the fiber grating, and hence optical signal wavelength or amplitude. A constant DC field, instead of a pulse field can also be used, but the use of a DC pulse field is preferred so that a constant supply of electrical current to the solenoid is avoided. The desired duration or speed of the pulse field is typically in the range of $10-10^{-8}$ seconds, preferably $10-10^{-6}$ seconds and even more preferably $10^{-1}-10^{-4}$ seconds. For a thick magnet geometry, the use of pulses that are too fast is not desirable because of the eddy current loss. The shape of the current pulse can be rectangular, rectified sinusoidal or irregular as long as the maximum field needed for a magnetization to the pre-determined remanence is accomplished.

The last step in FIG. 4 (Step F) is to combine a multiplicity of the magnetically tunable and latchable gratings with circulators and other optical components, and carry out the wavelengthdivision-multiplexed fiber optic telecommunications.

EXAMPLE 1

A tunable optical fiber grating device was assembled as follows. The grating has a Bragg reflection wavelength of 1541.1 nm. Fe-28 wt % Cr-7 wt % Co alloy rod (0.185 inch diameter) was fabricated by deformation aging to exhibit a square magnetic hysteresis loop with $H_c\sim45$ Oe and the squareness ratio $M_r/M_s$ (the remanent magnetization/ saturation magnetization) of ~0.97. The length of the magnet rod was reduced to 4 inches so that the M-H loop is skewed by ~50 Oe. Non-programmable bias magnets (Sm—Co magnets) were attached to the outer end of the Fe—Cr—Co programmable magnets. One end of the fiber grating was epoxy-bonded to the near-gap end of the programmable magnet while the other end of the grating was bonded to a quartz tube (~0.25 inch inside diameter) as illustrated schematically in FIG. 1 or FIG. 8, as described below. The other programmable magnet (the left hand side magnet in FIG. 1 or FIG. 8) was positioned adjacent to the right hand side magnet with a 20 mil air gap, and then was epoxy-bonded to the quartz tube. This assembly was placed in a solenoid and electrical current was passed to apply a magnetic field and then removed in order to induce remnant tensile strain on the fiber grating.

Figure 5:
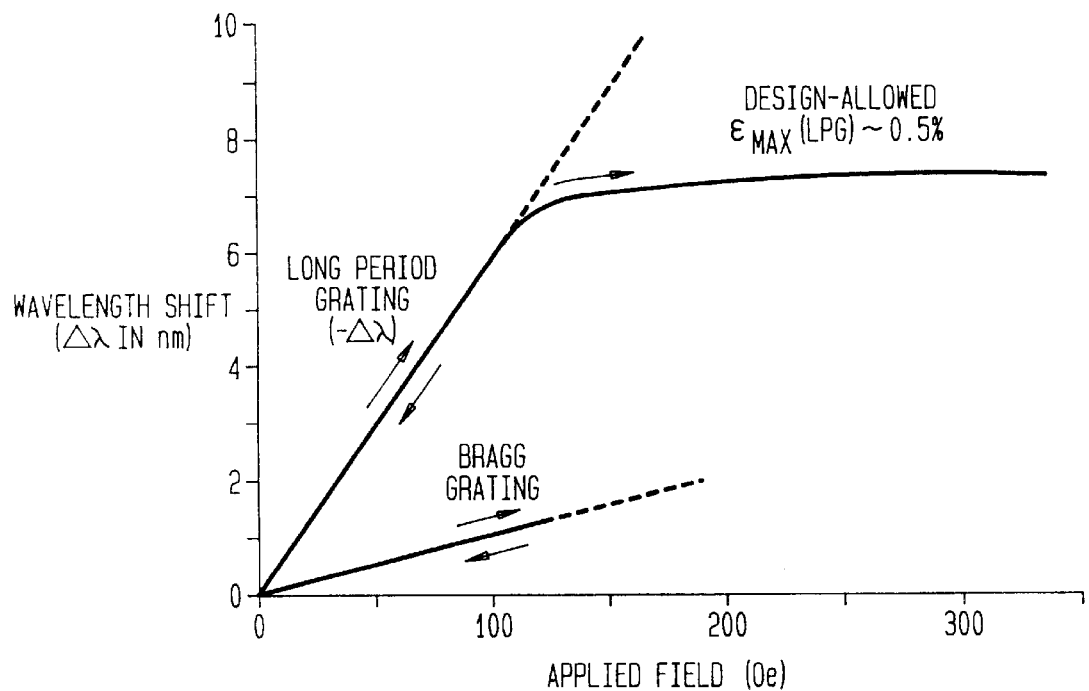
FIG. 5 shows experimental data on wavelength shift induced by applied field in an exemplary inventive device.

FIG. 5 is a graphical illustration showing the wavelength shift induced by the applied field in a typical tunable grating device described above. Both Bragg gratings and long-period gratings respond to the magnetic tuning and exhibit substantial shift in optical signal wavelength.

Figure 6:
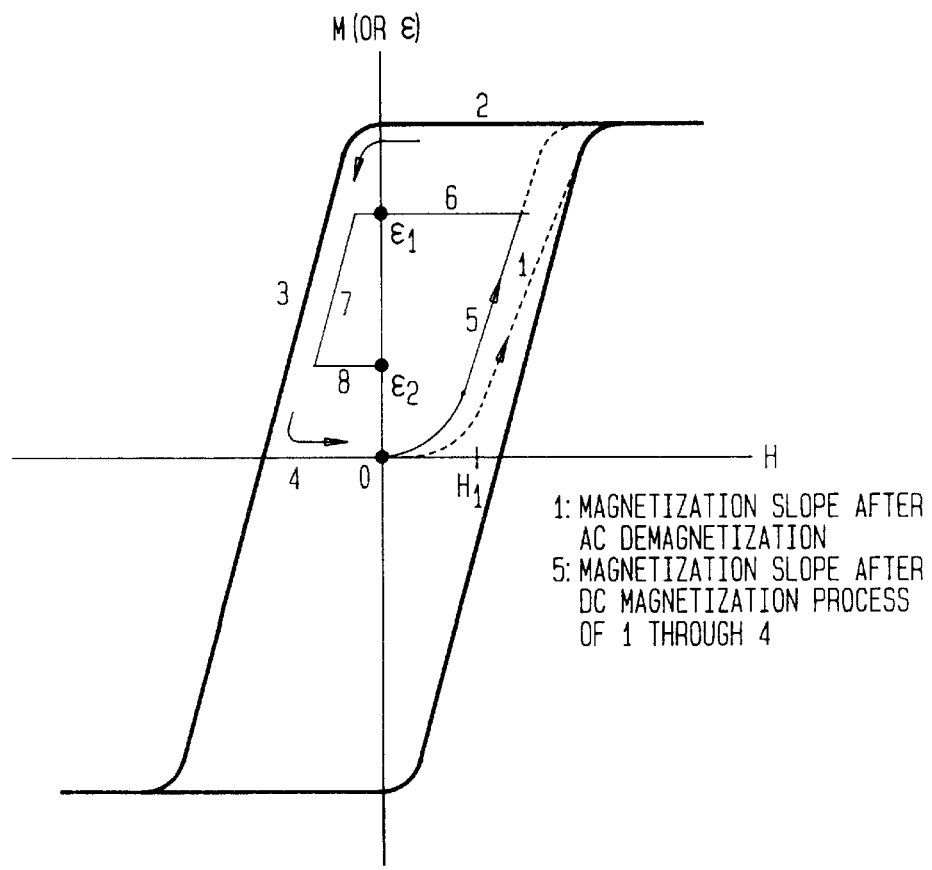
FIG. 6 compares the magnetization curves for the latchable Fe—Cr—Co magnet after (a) ac demagnetization and (b) dc demagnetization.

For operation of the tunable and latchable gratings in this invention, a magnetic field of suitable intensity needs to be applied for magnetization to a certain tuned state, remagnetization to a different tuned state, or demagnetization to remove the tensile strain completely. It is desirable to reduce the amount of power (electrical current) required in the solenoid to obtain a certain level of magnetic field. Alternatively, for the given allowed current, it is desirable to use less number of turns in the solenoid so that its dimension can be less bulky. Hence it is desirable to obtain higher magnetization with low applied field. It has been discovered that the programmable square-loop magnets such as deformation-aged Fe—Cr—Co magnets can be magnetized to a higher magnetic moment with less field if the prior demagnetization of the magnet is carried out by negative DC field rather than the commonly used AC demagnetizing with gradually diminishing field. This is schematically illustrated in FIG. 6. For the given $H_1$ field, the prior DC demagnetized Fe—Cr—Co magnet advantageously produces magnetization at least about 10–30% higher than the AC demagnetized magnet especially in the lower field regime.

Figure 7:
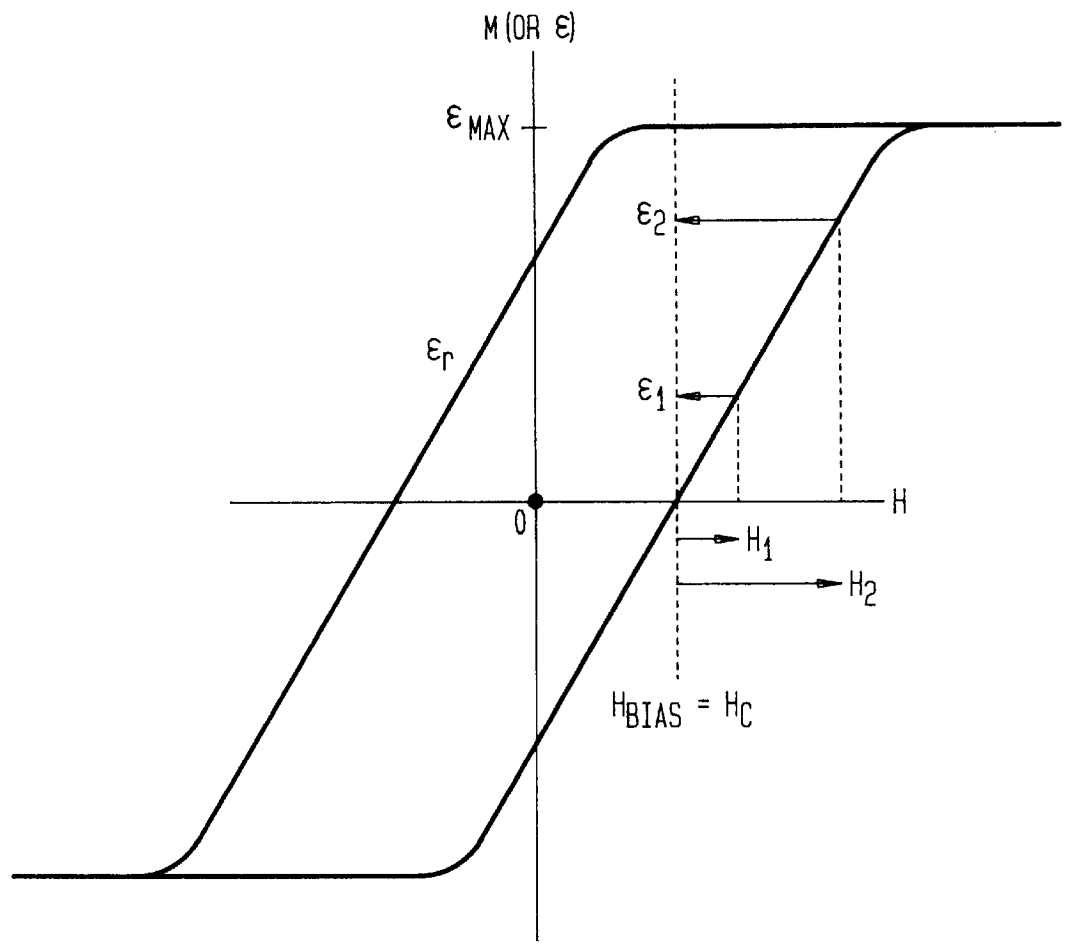
FIG. 7 schematically illustrates the benefit of composite magnet assembly using both the programmable latchable magnet and non-programmable, bias permanent magnet.

Another way of reducing the power requirement in the solenoid for the magnetizing part of the tuning is to apply a permanent bias field with its strength comparable to the value of coercivity for the given programmable magnet, with the preferred bias field magnitude in the range of 0.2–1.1 times that of $H_c$. This is illustrated in FIG. 7 with a programmable magnet (Fe-28% Cr-7% Co alloy, deformation aged to a square loop magnet, 0.185 inch diameter and 4 inch length with $H_c$~45 Oe).

Figure 8:
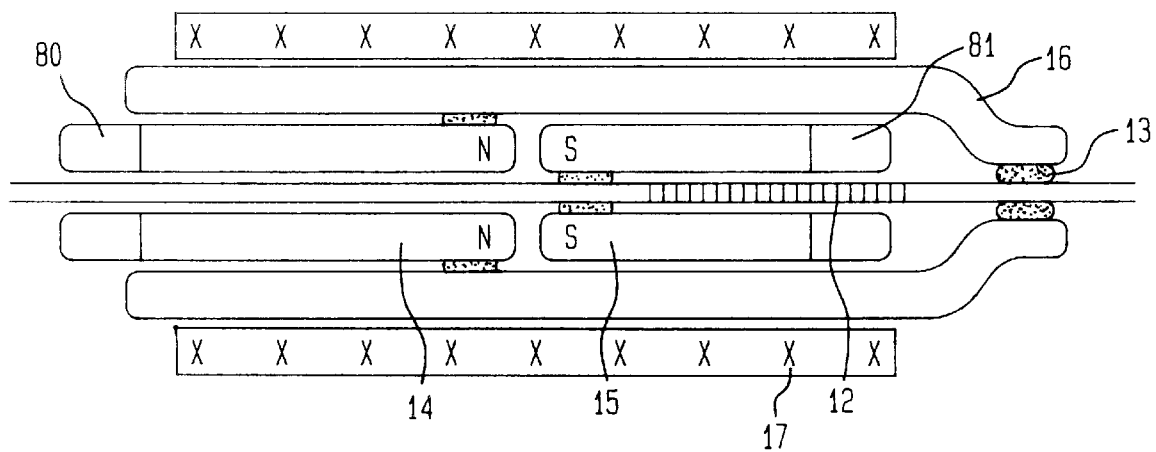
FIGS. 8 and 9 represent exemplary embodiments of composite magnet assembly for a tunable optical fiber grating.

FIG. 8 illustrates an alternative embodiment employing additional bias magnets 80, 81. The addition of two small Nd—Fe—B bias magnets, 0.17 inch dia, 0.20 inch long, onto the outside ends of each 14, 15 magnets, introduces a bias field of 50 Oe. In order to achieve, for example, a magnetization of 2 kG, it now takes only 10 Oe field instead of the 70 Oe. The reduced field requirement advantageously results in a reduced current requirement or fewer solenoid winding turns as the induced field by a solenoid is expressed by H (solenoid)=1.27 ni/L where n is the number of turns, i is the applied electrical current in amperes, and L is the length of the solenoid in cm. However for the demagnetization process (often needed for shifting the magnetization state and altering the amount of strain on the grating), a higher field in the opposite direction is required to overcome the applied bias field. An additional benefit of the bias magnet is that the length of the programmable magnet can also be reduced, as a more skewed M-H loop can now be accommodated without a significant loss of fiber strain latchability such as shown in FIG. 3(C) by the upper arrow. The bias field also increases the range of tunable strain, e.g., from $\epsilon_r$ to $\epsilon_{max}$ in FIG. 7.

Figure 9:
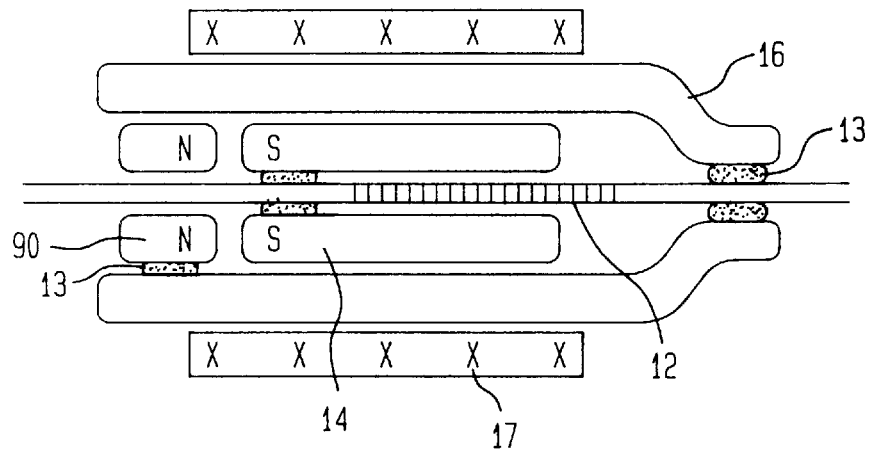

FIG. 9 shows an alternative embodiment using a single bias magnet 90. The bias magnet can be secured close to or directly onto the programmable magnets by epoxy, solder or mechanical attachment.

Figure 10:
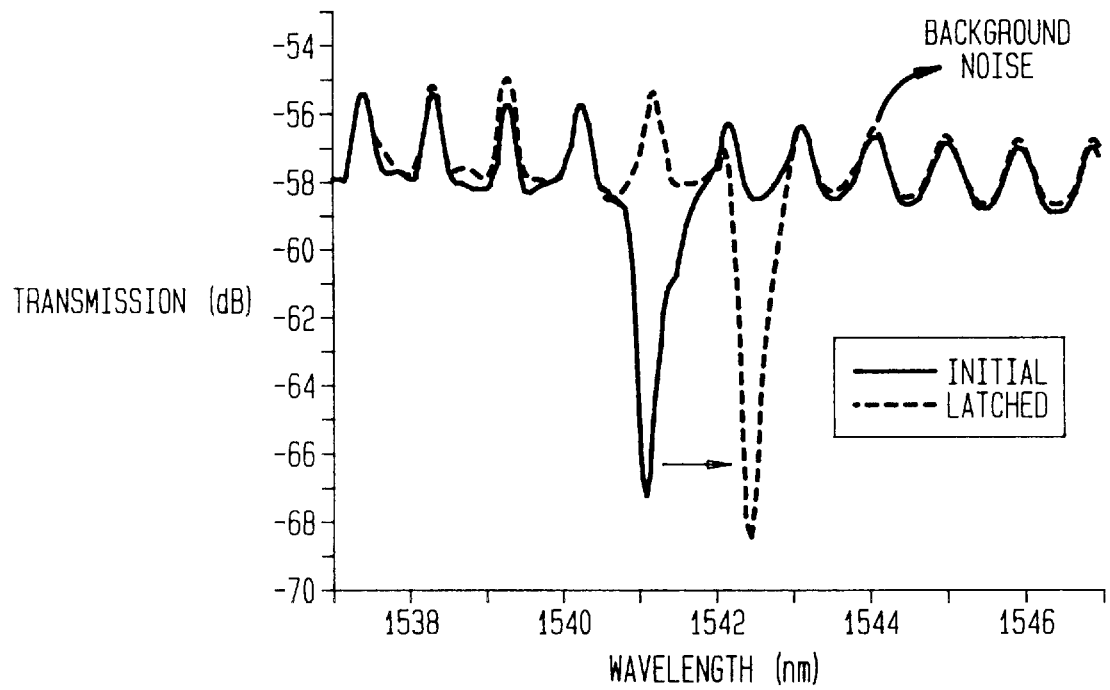
FIG. 10 shows experimental data on induced wavelength shift in a magnetically tunable fiber grating assembly containing bias magnets.

Shown in FIG. 10 are actual wavelength spectra of optical fiber signal through a magnetically tunable grating employing bias field magnets. The Bragg grating wavelength is shifted by activating the tuning/latching mechanism, from 1541.1 nm to 1542.4 nm by an applied field of 75 Oe using a current of 175 mA.

During engineering applications of optical fiber gratings, inadvertent temperature-dependent change in the refractive index as well as in the dimensional grating periodicity change can cause an undesirable shift or error in the operating communication wavelengths. As the temperature-induced shift in the grating reflection wavelength is typically substantial, e.g. of the order of 1 nm/100° C. for $\lambda \approx 1550$ nm, it is important that a temperature compensating means be provided so that the device is substantially temperature independent. An advantage of the tunable grating devices in accordance with the invention is that temperature compensation can conveniently be accomplished by optionally incorporating a temperature sensor 19 and feedback system 20, as illustrated in FIG. 1, so that the solenoid can adjust the applied field and the resultant latchable strain on the grating in order to compensate for the effects of temperature change.

The gratings described herein are especially useful in wavelength division multiplexed communication system which employ multiplexer/demultiplexer devices. In such systems, a "trunk" fiber carries optical signal channels at several wavelengths $\lambda_1, \lambda_2, \ldots \lambda_n$ and it is desirable to extract a single wavelength channel from the trunk fiber or to add a single wavelength channel onto the trunk. A wide variety of such devices can be made by interconnecting optical circulators and fiber gratings. Typically the channel reflected by the grating is dropped to the trunk fiber or is added to the trunk. Gratings as described herein permit selection at the grating of which channel is dropped or added.

Figure 11:
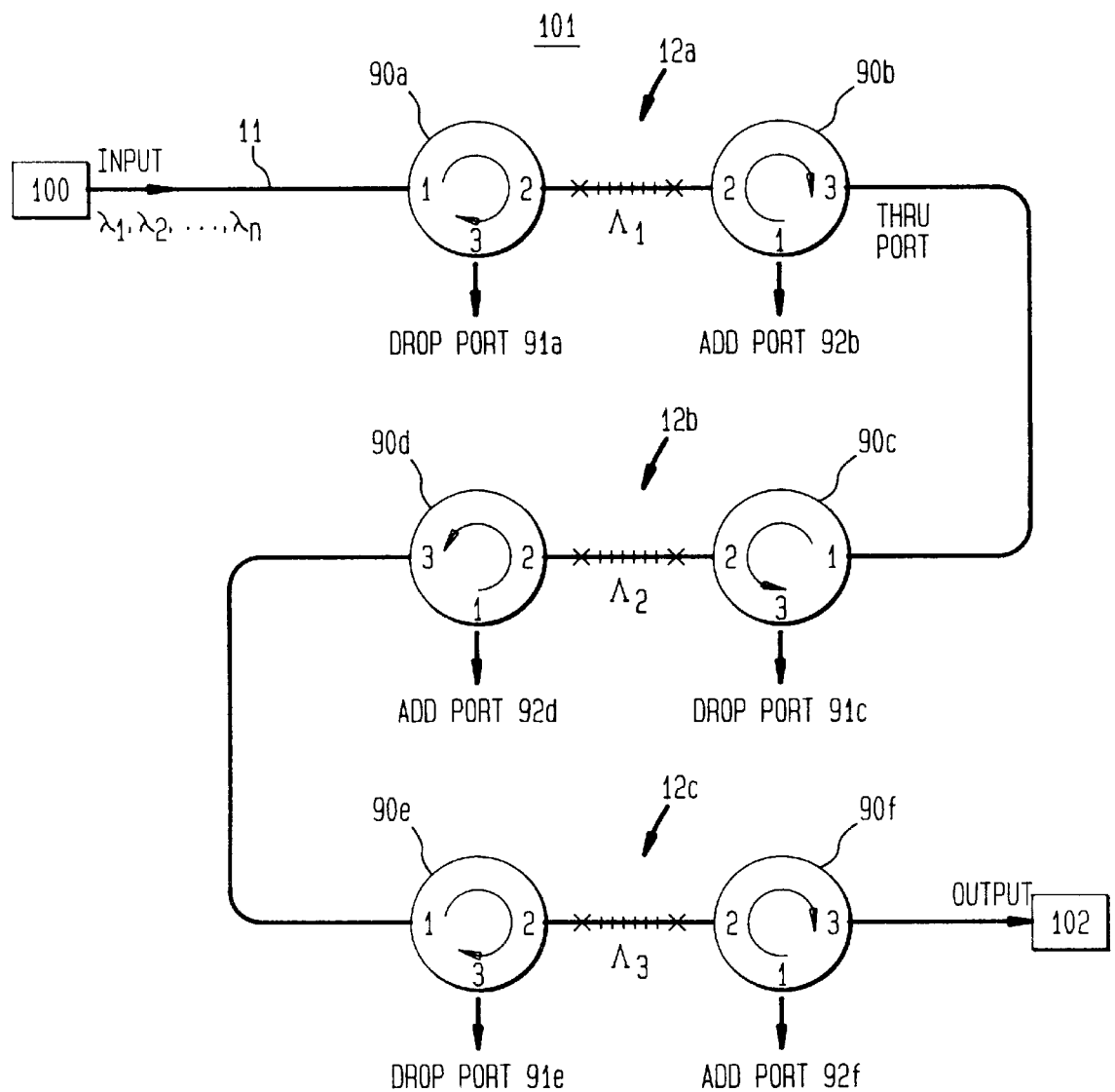
FIG. 11 illustrates an N channel add/drop system with a pair of circulators for each tunable grating.

FIG. 11 schematically illustrates a wavelength division multiplexed (WDM) communications system comprising a transmitter 100, an improved N-channel multiplexer/demultiplexer 101 and a receiver 102, all connected by trunk fiber 11. The input on fiber 11 consists of optical signals at several wavelengths, $\lambda_1$ to $\lambda_n$.

The improved multiplexer 101 comprises one or more pairs (here 3 pairs) of circulators. The circulators of each pair are separated by a gratings. For example, the first pair of circulators comprises upstream circulator 90a and downstream circulator 90b separated by grating 12a. The second pair is 90c and 90d separated by grating 12b. In each pair, the upstream circulator (90a, 90c, 90e) serves to divert a forward propagating channel that matches the corresponding grating (12a, 12b, 12c) into a corresponding DROP port 91a, 91c, 91e. The downstream circulators (90b, 90d, 90f) similarly serve to insert into fiber 11 signals at ADD ports 92b, 92d, 92f, provided the wavelengths of the signals to be added correspond to the respective gratings 12a, 12b and 12c.

The device is improved by making any one of these gratings 12a, 12b, 12c tunable as set forth above, and preferably by making each tunable. If the grating is tuned so that it coincides with a different channel, then the different channel can be added or dropped. Moreover, a tunable grating can also perform a DISABLE function. If the grating is tuned between the channels, then the ADD/DROP function is temporarily disabled.

Figure 12A:
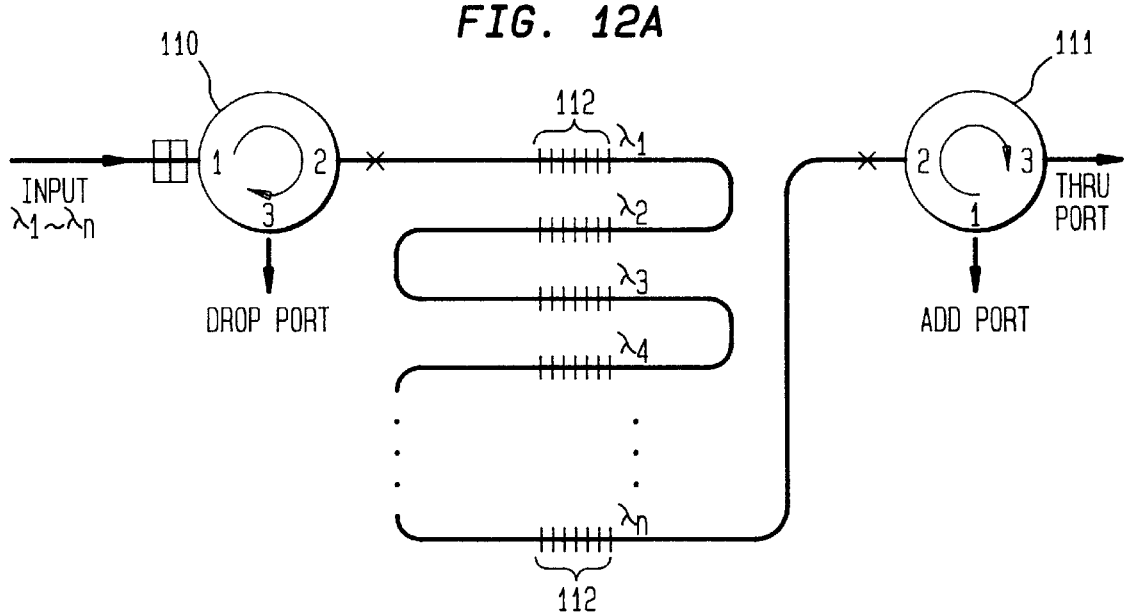
FIG. 12 shows an N channel add/drop WDM communication system with two circulators and one or more tunable gratings.
Figure 12B:
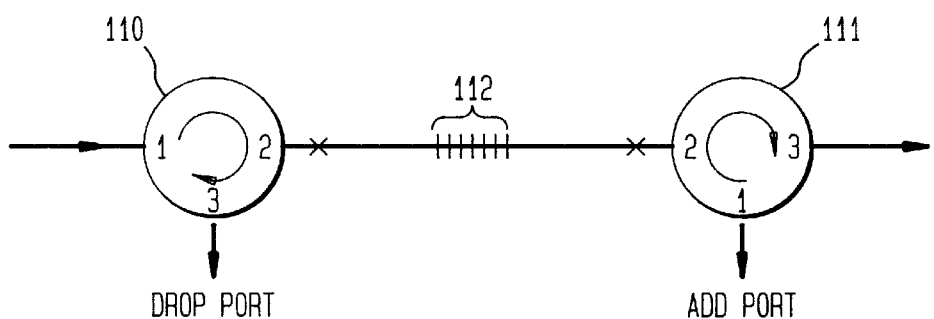

Alternatively, as shown in FIG. 12(a) only one pair of circulators and a series of tunable gratings (e.g., N gratings) can be used, or as shown in FIG. 12(b), the device can use one pair of circulators and one grating tunable and latchable over the entire N-channel span.

EXAMPLE 2

A 32-channel, reconfigurable ADD/DROP system for Wavelength Division Multiplexing is constructed using 32 magnetically tunable fiber gratings connected in a series with associated circulators or directional couplers to serve as ADD or DROP ports as a schematically illustrated in FIG. 11 and 12.

The nominal (mean) wavelength of the optical signal to be processed is 1550 nm, and the signal wavelength channels are separated from one another by a spacing of 0.8 nm producing a center-to-center spacing with a channel width of 0.3 nm. The refractive index periodicity ($\Lambda$) of each grating is made into a predetermined dimension so that all 32 gratings have their Bragg reflection wavelengths off by a half channel (placed at the mid-channel positions), and hence with no tuning activated, all 32 wavelength signals pass through the ADD/DROP system without being filtered (dropped). If a certain selected group of channels (e.g., Channels #1, #5, and #27) needs to be dropped, the magnetic tuning devices for those gratings are activated by a magnetic pulse field so as to strain the fiber gratings by ½ channel, e.g., $\Delta\lambda/\lambda$ of roughly 0.4 nm/1550 nm≈0.025%. The programmable magnet material and the magnitude of the magnetic field applied is predetermined to produce and maintain this amount of remanent strain in the fiber, and to make the channels #1, #5 and #27 Bragg reflected and filtered (dropped). To cancel the DROP operation of a channel, e.g. channel #3, a demagnetizing DC field or AC field with gradually decreasing amplitude (e.g. 60 Hz field applied for 2 seconds) is applied to the magnet element to remove the strain on the fiber grating. The ADD operation is performed in a similar manner (e.g. for channels #4, #9, #14 and #23) but with a backward transmission through a circulator and Bragg reflection in the forward direction.

The magnetically reconfigurable fiber grating assembly provides advantages for a variety of optical fiber communication devices and communication operation systems. For example, a chirped Bragg grating (e.g., with a gradient periodicity covering $\lambda_1$ through $\lambda_4$ along the length of one grating, or with the four distinct grating structures written in series in one grating length) can be made magnetically tunable, according to the invention. In this case, the four channels are dropped or added simultaneously as a group. A plurality of chirped gratings can be connected as in FIGS. 11 or 12 so that the group-wise add/drop operation of channels can be performed covering a wider bandwidth.

Figure 13:
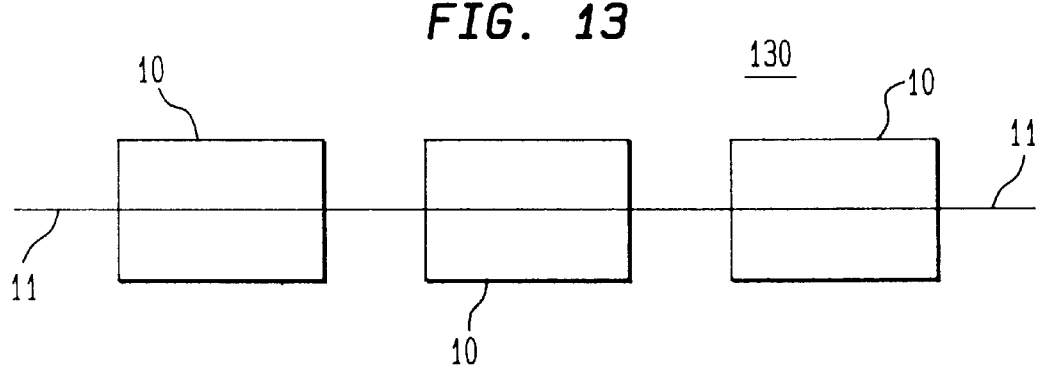
FIG. 13 schematically illustrates a wide band tunable loss filter.

As schematically illustrated in FIG. 13 tunable loss filter 130 covering a wider bandwidth than a single long-period grating device can be constructed by concatenating magnetically tunable long-period gratings 10 along a single fiber 11.

Figure 14:
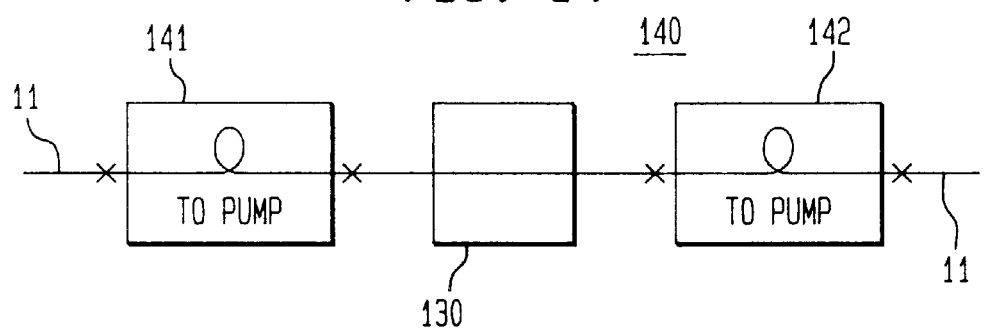
FIG. 14 shows a dynamically gain-flattened optical amplifier.

FIG. 14 illustrates a dynamically gain-flattened amplifier 140 made by including a tunable loss filter 130 composed of the tunable long-period gratings in a rare earth doped amplifier (such as an erbium-doped fiber amplifier). The amplifier 140 preferably comprises a plurality of rare-earth fiber amplifier stages (e.g. two stages 141 and 142) with the tunable loss filter 130 preferably disposed at the output of the first stage. This gives the highest power and the lowest noise figure. For applications where noise is less important, the filter 130 can be placed in front of the first stage 141. For applications where power is less important, it can be placed at the output of the last stage 142. Long-period gratings for flattening the response of an amplifier are described, for example, in U.S. Pat. No. 5,430,817 issued to A. M. Vengsarkar on Jul. 4, 1995, which is incorporated herein by reference. Such devices 140 can be advantageously used in WDM optical communication systems to ensure equalized amplification under a wide variety of conditions.

Figure 15:
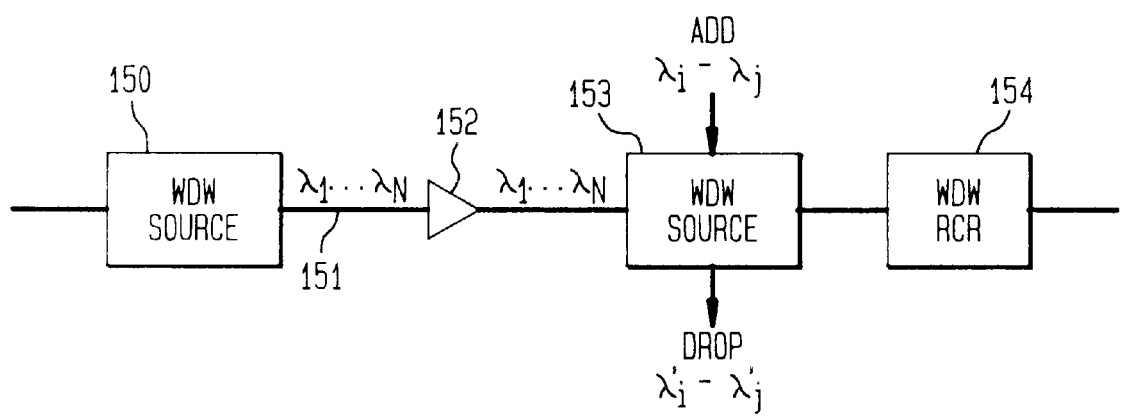
FIG. 15 schematically illustrates an optical WDM communication system which can employ the amplifier of FIG. 14.

FIG. 15 schematically illustrates an optical WDM communication system comprising a source 150 of modulated WDM optical signal channels $\lambda_1, \lambda_2, \ldots \lambda_n$ along a trunk fiber 151. The channels pass through one or more gain equalized amplifiers 152, which can be gain flattened amplifiers as shown in FIG. 14, and through one or more ADD/DROP devices 153, which can be ADD/DROP devices as shown in FIGS. 12A, or 12B. Ultimately the channels proceed to a WDM receiver 154.

It is to be understood that the above-described embodiments are illustrative of only a few of the many possible specific embodiments which can represent applications of the invention. The magnetically reconfigurable and latchable device concept, assembly and operation method described here are also useful for making various other types of non-fiber optical gratings for the purpose of reconfiguring or tuning either wavelength, amplitude or phase of optical information. For example, slitted gratings, transmission-type or reflection-type grooved gratings, or phase gratings can be made magnetically tunable, according to the invention, for various optical applications such as for producing fresnel lenses, holographic images, and optical memory devices. Numerous and varied other arrangements can be made by those skilled in the art without departing from the spirit and scope of the invention.

What is claimed:

1. In a tunable optical grating device comprising an optical grating including a body having a plurality of substantially equal spaced optical grating elements along a length of the body, a pair magnets at least one of which magnets is secured to said body, and an electromagnet for applying a magnet field to said magnets thereby inducing force between said magnets and creating strain across said grating, the improvement wherein at least one of the magnets of said pair is programmable by said eletromagnet to latchably select among plural levels of tensile strain across said grating, said programmable magnet exhibiting a square magnetic hypteresis loop with a squareness of at least 0.85 and a coercive field within the range of 10–100 Oe skewed by a value of at least 0.3 of the coercive field.

2. The device of claim 1 wherein said body comprises a length of optical waveguide.

3. A device according to claim 1 wherein said programmable magnet exhibits a square magnetic hypteresis loop skewed by a value of at least 0.6 of the coercive field.

4. A device according to claim 1 wherein said grating is a Bragg grating.

5. A device according to claim 2 wherein said grating is a long-period grating.

6. A wave division multiplexed optical communications system comprising a source of multiple wavelength optical signal channels transmitted from said source along an optical trunk fiber through a multiplexer/demultiplexer, wherein said multiplexer/demultiplexer comprises a tunable grating according to claim 2.

7. A tunable loss filter comprising one or more long-period grating devices according to claim 5.

8. A dynamically gain-flattened optical amplifier comprising one or more long-period grating devices according to claim 5.

9. An optical amplifier comprising a plurality of rare-earth doped optical amplifier stages and a tunable loss filter comprising one or more long-period grating devices according to claim 5.

10. An optical communication system comprising a gain-flattened optical amplifier including one or more long-period grating devices according to claim 5.

11. A device according to claim 1 wherein said grating is a diffraction grating.

12. A device according to claim 2 wherein said wavelength is optical fiber and including a guide limiting the motion of said magnet to limit twisting of said fiber.

13. A device according to claim 12 wherein said guide comprises a tube for guiding said magnet.

14. A device according to claim 1 including one or more stops for limiting the force applied to said fiber.

15. A device according to claim 1 including one or more bias magnets coupled to said programmable magnet.

16. A device according to claim 1 wherein at least one non-programmable bias magnet is magnetically coupled to said programmable magnet.

17. An optical multiplexer/demultiplexer comprising at least one optical grating is a tunable grating according to claim 2.

18. In a tunable optical grating device comprising an optical grating including a body having a plurality of substantially equal spaced optical grating elements along a length of the body, a pair magnets at least one of which magnets is secured to said body, and an electromagnet for applying a magnet field to said magnets thereby inducing force between said magnets and creating strain across said grating, the improvement wherein at least one of the magnets of said pair is programmable by said eletromagnet to latchably select among plural levels of tensile strain across said grating, said programmable magnet exhibiting a square magnetic hytseresis loop with a squareness of at least 0.85 and a coercive field within the range of 10–100 Oe skewed by a value of at least 0.3 of the coercive field, and the device includes a spectrum analyzer and a feedback loop to said electromagnet to control the degree of wavelength tuning.

19. In a tunable optical grating device comprising an optical grating including a body having a plurality of substantially equal spaced optical grating elements along a length of the body, a pair magnets at least one of which magnets is secured to said body, and an electromagnet for applying a magnet field to said magnets thereby inducing force between said magnets and creating strain across said grating, the improvement wherein at least one of the magnets of said pair is programmable by said eletromagnet to latchably select among plural levels of tensile strain across said grating, said programmable magnet exhibiting a square magnetic hysteresis loop with a squareness of at least 0.85 and a coercive field within the range of 10–100 Oe skewed by a value of at least 0.3 of the coercive field, and the device includes a temperature sensor and a feedback loop to said electromagnet to automatically compensate for temperature-dependent changes in refractive index and grating periodicity.

20. In an N-channel optical ADD/DROP multiplexer/demultiplexer comprising a plurality of optical circulators and a plurality of optical fiber gratings interconnected by an optical fiber for adding and/or dropping an optical communications channel from said fiber, the improvement wherein at least one optical grating is a tunable optical grating comprising:

an optical grating including a length of optical waveguide having a plurality of substantially equal spaced optical grating elements along a length of the waveguide, a pair magnets at least one of which magnets is secured to said waveguide, and an electromagnet for applying a magnet field to said magnets thereby inducing force between said magnets and creating strain across said grating, wherein at least one of the magnets of said pair is programmable by said electromagnet to latchably select among plural levels of tensile strain across said grating, said programmable magnet exhibiting a square magnetic hysteresis loop with a squareness of at least 0.85 and a coercive field within the range of 10–100 Oe skewed by a value of at least 0.3 of the coercive field.

* * * * *